Feb. 17, 1970  J. C. FIRMIN  3,495,906
LASER RANGE FINDERS AND DISPLAYS
Filed Oct. 28, 1965  2 Sheets-Sheet 2

INVENTOR
Jervois Campbell Firmin
BY
Baldwin & Wight
ATTORNEYS

United States Patent Office 3,495,906
Patented Feb. 17, 1970

3,495,906
LASER RANGE FINDERS AND DISPLAYS
Jervois Campbell Firmin, Essex, England, assignor to English Electric Valve Company Limited, London, England, a British company
Filed Oct. 28, 1965, Ser. No. 505,565
Claims priority, application Great Britain, Nov. 30, 1964, 48,663/64
Int. Cl. G01c 3/08
U.S. Cl. 356—4                          14 Claims

ABSTRACT OF THE DISCLOSURE

A laser range finding and display arrangement in which a scene is flood-lit by light from a laser which is pulsed successively by pulses spaced apart in time by more than twice the light propagation time over the longest range to be displayed. Images received as a result of one pulsing of the laser are stored and displayed without deflection in a display tube. Images received as a result of a further pulsing are also stored and are displayed in the tube with a deflection in one direction which increases in magnitude during the time in which images resulting from the further pulsing are being received. The displacement of the individual features in the second series of displayed images, relative to the corresponding individual features in the first series of images provides an indication of the individual ranges of the individual features in the display.

---

Figure 1:
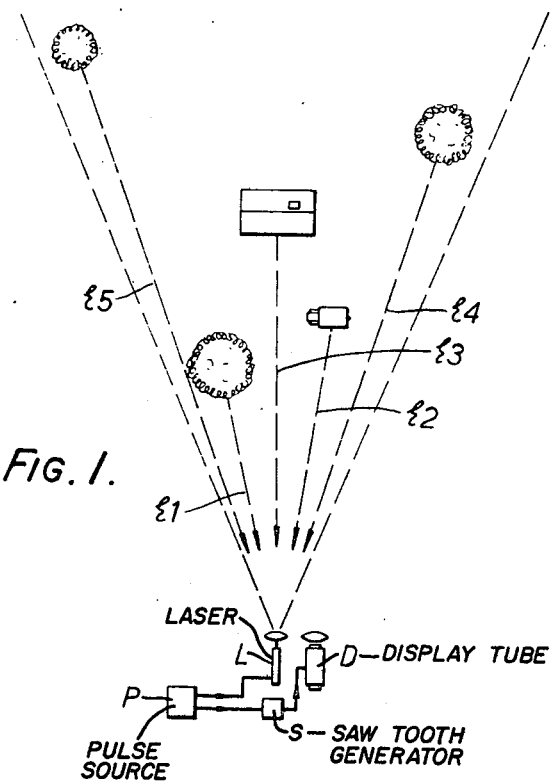

This invention relates to laser range finders and displays. The object of the invention is to provide improved arrangements whereby a scene covering a substantial area greatly exceeding the cross-sectional area of a laser light beam can be displayed by a display which will also display the different ranges of different objects in the scene.

When a laser is employed for range finding by methods as at present known, the laser is arranged to transmit a very narrow, sharp beam of light towards an object whose range is to be ascertained, light reflected from the object is received, and the propagation time of the light to the object and back is ascertained to determine the range. The method is, in fact, analogous to the method of range finding employed in an ordinary pulsed Radar System. There is, however, often a requirement to survey a scene which subtends, at the point of surveillance—the location of the illuminating laser a solid angle of substantial magnitude—and not only to produce a display of the surveyed scene but also to ascertain the individual different ranges of different individual objects in the scene. If the illuminating laser is so arranged that, when pulsed, it transmits a wide angled beam of light so as to illuminate the scene, a display of the scene can be obtained but obviously, in such a case, the individual different ranges of individual different objects in the scene is not ascertainable by the known method above described since the laser no longer directs a narrow light beam towards an individual object but "flood lights" the whole scene. The present invention seeks to meet this difficulty and to provide means whereby a scene, flood-lit by a laser, can be displayed by a display which not only shows the scene but also the different individual ranges of different individual objects therein.

According to this invention a laser illuminated scene is displayed and the range of different individual objects in said scene are also displayed by flood lighting said scene with successive pulses of light from a laser which is successively pulsed by pulses spaced apart in time by more than twice the light propagation time over the longest range to be displayed, producing and storing an image of said scene as illuminated by one of said light pulses and producing and storing a second image of said scene as illustrated by a later one of said pulses with the objects in said second image displaced relative to the corresponding objects in the first image by amounts dependent upon the ranges of said objects.

According to a feature of this invention a laser display and range finding system comprises a laser arranged when pulsed to floodlight a scene, means for pulsing said laser with two successive pulses spaced apart in time by more than twice the light propagation time over the longest range to be ascertained; an electron discharge tube comprising a photocathode arranged to receive an optical image of light with which said scene is flood-lit and reflected therefrom, an electrical charge image storing target, means for utilising emission from said photo-cathode to produce an electrical charge image on said target and electron deflecting means operative when actuated to displace points in said electrical charge image in a pre-determined direction relative to corresponding points in said photo-cathode; and means for causing said electron deflecting means to effect deflection over a period commencing at one of the pulsings of said laser at a rate which is different from the deflection rate (if any) applied over a period commencing at the other of said pulsings of said laser, whereby two electrical charge images are produced on said target with charges representative of individual objects in one image displaced with respect to those representative of the same objects in the other by amounts dependent upon the ranges of said individual objects.

The simplest way of obtaining the required relative displacement is by applying deflection at a pre-determined rate at a period commencing with the second pulsing, there being no applied deflection during the period between the two pulsings. It is however equally possible to apply deflection at a pre-determined rate over a period commencing with the first pulsing deflection ceasing at the second pulsing.

Preferably the discharge tube comprises, between the photo-cathode and the charge image storing target, an intermediate light image producing surface adapted and arranged to produce a second light image from electron emission from the photo-cathode, a second photo-cathode adapted to produce electron emission in correspondence with the second light image, and an electrical charge storing target adapted and arranged to produce and store an electrical charge image from emission from the second photo-cathode. Preferably the electron deflecting means are arranged laterally to deflect electron rays passing from the first mentioned photo-cathode to the intermediate light image producing surface.

In a preferred construction of discharge tube the first mentioned photo-cathode is on the inner surface of a fibre-optic plate at one end of the tube, the intermediate light image producing surface is a phosphor layer on one face of a second fibre-optic plate in an intermediate position in the length of the tube said face being towards the first mentioned photo-cathode, and the second photo-cathode is on the opposite face of the second fibre optic plate.

The charge images on the electrical charge image storing target may be utilised in any convenient way—for example they may be scanned by a scanning cathode ray to produce picture signals for utilisation to produce visible images in a separate display tube in manner known per se—but preferably the discharge tube is a direct view display tube including a display light image producing surface and a source of electrons adapted and arranged to flood said display light image producing surface through the charge image storing target whereby light images corresponding to the charge images are produced on the display light image producing surface. This last mentioned surface may conveniently be a phosphor on the inner surface of a fibre-optic plate at the end of the tube remote from the first mentioned photo-cathode.

The electron deflecting means may be electrostatic or electro-magnetic but are preferably condstituted by electro-static deflecting plates within an electron focussing electrode located between the first mentioned photo-cathode and the intermediate light image producing surface. Where a source of electrons for flooding a display light image producing surface is provided it may conveniently be within an electron focussing electrode located between the second photo-cathode and the electrical charge image storing target.

Electron deflection is preferably produced by means of a substantially linear saw tooth wave generator connected and arranged to be triggered at one of the pulsings of the laser to commence a saw tooth wave excursion.

Figure 2:
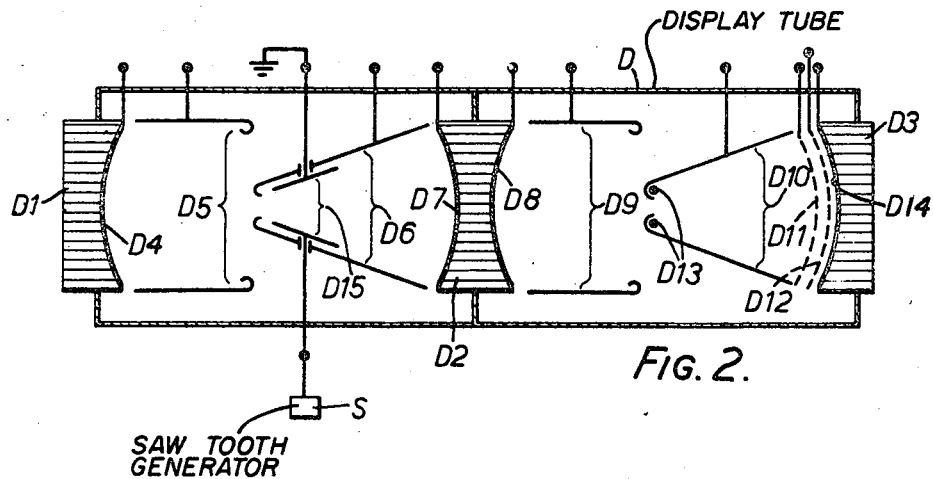
Figure 3:
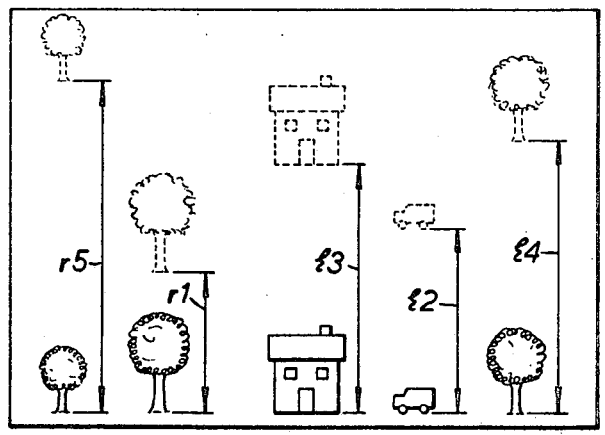

The invention is illustrated in and further explained in connection with the accompanying drawings in which FIG. 1 is a purely schematic representation of an arrangement which is in accordance with the invention and which includes a laser illuminating a scene in depth; FIG. 2 is a diagrammatic view of one form of display tube for viewing the illuminated scene and FIG. 3 is an "idealised" representation of the display produced by a tube as represented in FIG. 2 of a scene as presented in FIG. 1.

Referring to FIG. 1 L represents a laser which is pulsed to cause it to transmit via a suitable optical system (represented diagrammatically by a lens) a spreading beam of light to illuminate a scene. The beam is between the outermost broken lines which represent the limits of the light beam. The pulsing arrangements are only schematically indicated by the block P since they are as known per se (except for the "double pulsing" to be described below) and form per se no part of this invention. In accordance with this invention the laser is double pulsed, that is to say it is pulsed twice in succession, the interval between the two successive pulses being rather more than twice the propagation "go" and "return" time of light to and from an object at the maximum range the apparatus is required to handle. If this range is 2 miles a suitable interval between the pulses is $20\mu$ sec. The scene illuminated by the laser is displayed by means of a display tube represented in FIG. 1 by the block D and which is subjected to special deflection from a saw-tooth wave source S in a manner to be described below.

FIG. 2 shows a suitable form for the display tube D. It has an evacuated enveloped also referenced D at one end of which is a so-called fibre-optic plate D1 having a concave curved inner surface. The envelope contains, about half way along its length, a second fibre-optic plate D2 having two concave curved surfaces, one at each end, and at the other end of the envelope is a third fibre-optic plate D3 also with a concave curved inner surface.

On the curved surface of the plate D1 is deposited a photo-cathode D4. Incoming light representative of the scene illuminated by the laser L is focussed on the photo-cathode D4 which accordingly emits electrons constituting an electron image of the scene. These electrons are focussed by focussing electrodes D5 and D6 on to an aluminised phosphor D7 which is deposited on the curved face of the plate D2 facing towards the cathode D4. On the other curved face of the plate D2 is a second photo-cathode D8 which receives light from the phosphor D7. Electrons from cathode D8 are focussed by further focussing electrodes D9 D10 through a collector mesh D11 on to a storage mesh D12 of construction known per se. It may, for example, be constituted by a metal mesh with a suitable insulating layer deposited thereon on the side thereof facing towards the cathode D8. Such storage meshes are known in direct viewing storage cathode ray tubes. As will be well understood electrons from the cathode D8, incident upon the mesh D12 will produce thereon, by secondary emission effect, a positive electric charge image representative of the scene. A flood beam of electrons, produced by a flood beam source represented at D13 floods a phosphor D14 with electrons with reach it via the mesh D12 the charge image on which modulates the flood beam and thus controls the number of flood beam electrons reaching the phosphor D14. The flood beam source should be arranged, as known per se, to flood the storage mesh as nearly as possible uniformly and normal to its surface.

As so far described a scene focussed on to the photo-cathode D4 will produce a corresponding electron beam which will produce a corresponding light image on the phosphor D7. This in turn will produce a corresponding electron beam from photo-cathode D8 producing a charge image on the storage mesh D12 and a final light image on the phosphor D14. This light image will be visible through the fibre-optic plate D3.

In accordance with this invention the electron beam between the photo-cathode D4 and the first phosphor D7 is subjected to deflection in a pre-determined direction and at a known speed during the period following the second pulsing of the laser. In the tube illustrated in FIG. 2 this is done by means of a pair of deflector plates D15 housed within the focussing electrode D6 and to which is applied a saw-tooth voltage from a linear saw-tooth wave generator S controlled from the pulse P so as to commence a saw-tooth excursion when the second of the two successive pulses occurs. Accordingly, when light produced by the first pulsed laser illumination of the scene is received on the phosphor D4 a corresponding charge image will be produced on the mesh D12 and a corresponding visible image, as represented in full lines in FIG. 3 will be seen on the phosphor D14. When, however, the second pulsing occurs, a steady deflection by the electrodes D15 commences. Therefore, when the light image due to illumination of the scene by the second pulsed laser transmission is produced on the phosphor D7, different objects in the scene will be displaced (relative to the positions of those objects in the light image D7 due to illumination of the scene by the first pulsed laser transmission) by different amounts dependent on the different ranges of those objects and a second charge image is produced on D12 together with a corresponding second light image on phosphor D14. FIG. 3 shows in dotted lines the objects in this second light image. The separation, in the direction of deflection, of the two displays of any object will be a direct measure of the range of that object. Thus the dimensions $r_1$ to $r_5$ in FIG. 3 are directly representative of the similarly referenced ranges in FIG. 1.

Suitable potentials for applying to the electrodes of the tube of FIG. 2 are given by way of example only, in the table below.

| Electrode: | Potential |
| --- | --- |
| D4, D5 | 0 |
| D6, D7, D8, D9 | 15 kv. |
| D15 (D.C.) | 15 kv. |
| D10, D11 | 18 kv. |
| D12 | 18 kv.–150 v. |
| Flood gun cathode of (D13) | 18 kv.–150 v. |
| D14 | 30 kv. |

The saw-tooth deflection voltage applied between the plates D15 is of course superimposed upon the D.C. voltage in the above table and the potential applied to the storage mesh D12, relative to the potential of the flood gun cathode D13, is adjusted as in customary practice with so-called half-tone direct viewing storage tubes.

Instead of applying deflection over a period commencing at the second pulsing, deflection may be applied over a period commencing at the first pulsing and stopped at the second pulsing.

I claim:

1. A laser range finding and display arrangement comprising pulse actuatable laser means for floodlighting a scene, means for pulsing said laser means with two successive pulses spaced apart in time by more than twice the light propagation time over the longest range to be ascertained; an electron discharge tube comprising photo-cathode means for receiving an optical image of laser light reflected from said scene and for emitting electrons constituting an electron image of said scene, an electrical charge image storing target, means for utilising the emission from said photo-cathode means to produce an electrical charge image on said target, electron deflecting means operative when actuated to displace points in said electrical charge image in a pre-determined direction relative to corresponding points on said photo-cathode means, and means for causing said electron deflecting means to effect varying deflection over a period commencing at one of the pulsing of said laser means, whereby two electrical charge images are produced on said target with charges representative of individual objects in one image displaced with respect to those representative of the same objects in the other image by amounts dependent upon the ranges of said individual objects.

2. An arrangement as claimed in claim 1 wherein said discharge tube comprises, between said photo-cathode means and the charge image storing target, an intermediate light image producing surface means for producing a second light image from the electron emission from the photo-cathode means, a second photo-cathode means for producing electron emission in correspondence with the second light image, said electrical charge image storing target comprising means for producing and storing an electrical charge image from emission from said second photo-cathode means.

3. An arrangement as claimed in claim 2 wherein said electron deflection means is located intermediate said first mentioned photo-cathode means and said intermediate light image producing surface means for laterally deflecting electron rays passing from the first mentioned photo-cathode means to the intermediate light image producing surface means.

4. An arrangement as claimed in claim 2 wherein the first mentioned photo-cathode means is on the inner surface of a fibre-optic plate at one end of the tube, the intermediate light image producing surface means comprising a phosphor layer on one face of a second fibre-optic plate in an intermediate position in the length of the tube, said one face being towards the first mentioned photo-cathode means, and the second photo-cathode means being on the opposite face of the second fibre-optic plate.

5. An arrangement as claimed in claim 1 wherein the discharge tube is a direct view display tube including a display light image producing surface means and including electron source means for flooding said display light image producing surface means through the charge image storing target whereby light images corresponding to the charges images are produced on the display light image producing surface means.

6. An arrangement as claimed in claim 5 wherein the last mentioned surface means comprises a phosphor layer on the inner surface of a fibre-optic plate at the end of the tube remote from the first mentioned photo-cathode means.

7. An arrangement as claimed in claim 3 wherein the electron deflecting means comprises electrostatic deflecting plates within an electron focussing electrode located between the first mentioned photo-cathode and the intermediate light image producing surface.

8. An arrangement as claimed in claim 2 including a visible display light image producing surface and a source of electrons for flooding said visible display light image producing surface and including electron focussing electrodes located between the second photo-cathode means and the electrical charge image storing target.

9. An arrangement as claimed in claim 1 wherein said means for causing said electron deflecting means to effect varying deflection includes a substantially linear saw tooth wave generator means triggered at one of the pulsings of the laser means for commencing a saw tooth wave excursion.

10. Range finding apparatus comprising light pulse source means for illuminating a scene with pulses of light; electron discharge tube means located in the path of light reflected from the scene including photo-cathode means for emitting electrons in response to an optical image of the scene received thereon, storage target means for providing an array of stored charges representative of the electron emission from said photo-cathode means to define a charge configuration representative of the scene, deflection means for deflecting electrons emitted from said photo-cathode means and means actuating said deflecting means following predetermined illumination pulses for varying with time for deflection of emitted electrons to cause the location of charges in the produced array to vary with the range of corresponding elements in the scene.

11. A laser range finding and display arrangement comprising pulse actuable laser means for flood lighting a scene with successive pulses of light, means for pulsing the laser means with two sucessive pulses spaced apart in time by more than twice the light propagation time over the longest range to be ascertained, and means for producing and storing a first image of said scene as illuminated by one of the light pulses and for producing and storing a second image of the scene as illuminated by a later one of the light pulses, said means for producing and storing said first image and said second image including means for displacing objects in one of said images relative to corresponding objects in the other of said images by amounts dependent upon the ranges of the objects.

12. An arrangement as claimed in claim 11 wherein said means for displacing objects in one of said images includes means for applying deflection to the means for producing and storing said images at a predetermined rate during a period commencing with occurrence of the second pulse and for applying zero deflection during the period between the first and second pulses.

13. An arrangement as claimed in claim 11 wherein said means for displacing objects in one of said images includes means for applying deflection to said means for producing and storing said images during a period commencing with occurrence of the first pulse and ending with occurrence of the second pulse.

14. An arrangement as claimed in claim 11 including means for scanning the stored images to produce picture signals and means for utilising said picture signals to produce visible images therefrom.

References Cited

UNITED STATES PATENTS 3,278,753  10/1966  Pitts et al. _____ 356—5 X
3,353,115  11/1967  Haiman _____ 331—94.5

OTHER REFERENCES

A Laser Rangefinder, Electronic Engineering, vol. 36, No. 437, July 1964, p. 482.

RONALD L. WIBERT, Primary Examiner

F. L. EVANS, Assistant Examiner

U.S. Cl. X.R.

331—94.5